United States Patent [19]

Barnum

[11] 3,978,890
[45] Sept. 7, 1976

[54] FLOW CONTROL CAM

[75] Inventor: Thomas G. Barnum, Fox Point, Wis.

[73] Assignee: Bradley Corporation, Menomonee Falls, Wis.

[22] Filed: Aug. 4, 1975

[21] Appl. No.: 601,922

[52] U.S. Cl............................ 137/636.4; 137/625.4
[51] Int. Cl.²......................................... F16K 31/32
[58] Field of Search........................... 74/17.8, 18.1; 137/625.4, 625.17, 636–636.4

[56] References Cited
UNITED STATES PATENTS

| | | | |
|---|---|---|---|
| 3,468,344 | 9/1969 | Sanford | 137/636.4 |
| 3,646,966 | 3/1972 | Smart | 137/625.4 |

Primary Examiner—Henry T. Klinksiek
Attorney, Agent, or Firm—Quarles & Brady

[57] ABSTRACT

A proportioning valve for controlling the mixture of two fluids includes a valve body provided with an internal recess, a pair of inlet ports and an outlet spout. A sleeve is inserted in the recess which has deflectable sealing cushions in front of the inlet ports, and a control rod cam which is movable axially and circumferentially for controlling flow is inserted within the sleeve. The control rod cam has a cylindrical portion which forces the sealing cushions into port closing positions, and a tapered region of special contours for controlling relative opening of the inlet ports.

4 Claims, 8 Drawing Figures

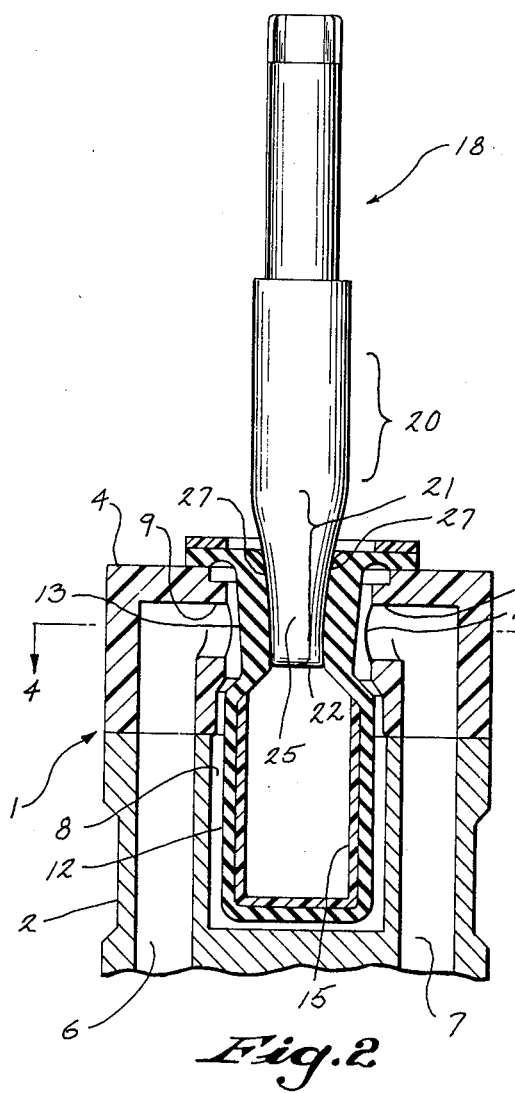
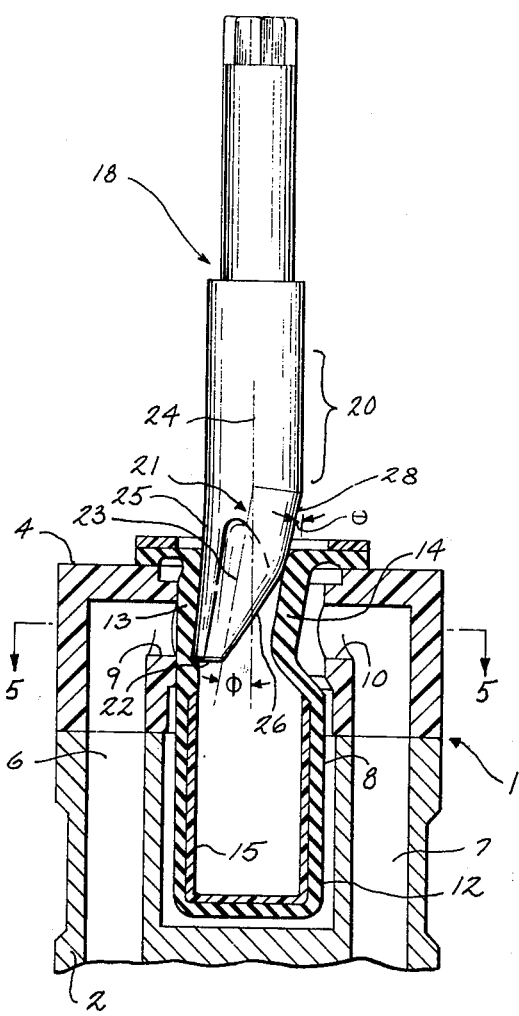
Fig. 2
Fig. 3
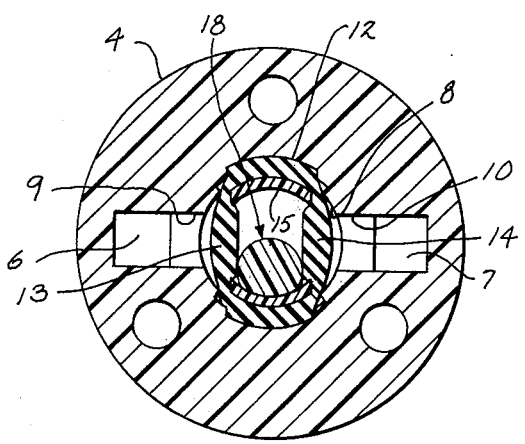
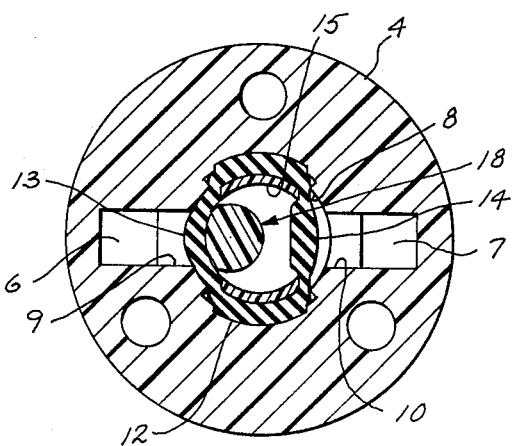
Fig. 4
Fig. 5

FLOW CONTROL CAM

BACKGROUND OF THE INVENTION

The present invention relates to improvements in fluid proportioning valves such as disclosed in U.S. Pat. No. 3,519,018 issued to Cole et al on July 7, 1970 and U.S. Pat. No. 3,646,966 issued to E. Allen Smart on Mar. 7, 1972. In valves of this type, a valve body is provided with an internal, generally cylindrical recess having a pair of diametrically opposed inlet ports in the side wall. A sleeve is inserted in the recess which has a flexible sealing cushion in front of each inlet port to function as an opening and closing valve, and to control the valving movement of these cushions a control rod cam is inserted within the sleeve. The control rod cam has a cylindrical portion that can be aligned with the inlet ports to press the cushions tightly against the inlet ports to close them, and it also has a tapered portion extending from the cylindrical portion that can be aligned with the inlet ports to control fluid flow through the ports. A lobe along one side of the tapered portion that functions to enhance the port closing action of the control rod characterizes the structure of the Smart patent, and the purpose of the lobe was to overcome problems of looseness which were encountered at times during mass manufacture of mixing valves. In particular, that patent intended to hold one valve tightly shut while the other was set for maximum fluid flow. The prior art control rod cams have been generally satisfactory and provide a significantly successful device in the art. However, such control rod cams do not impart fully desired flow conditions for a mixing valve, and do not exhibit such a high degree of sensitivity of adjustment as is now desired. To alleviate this drawback, the present invention has been proposed.

SUMMARY OF THE INVENTION

The present invention relates to fluid proportioning valves, and it more specifically resides in a control rod cam for controlling flow through a pair of valve inlet ports that has a valve closing portion providing port closing surface areas for simultaneously closing both inlet ports, and a tapered region that narrows in cross section toward a distal end, such tapered region presenting an initial slope along a dorsal side for allowing opening of a valve port, a port closing face along the opposite side that slopes radially outward, and a receding face which descends from said initial slope to the distal end of the cam.

The rod shaped control cam of the present invention is inserted between a pair of flexible sealing cushions that overlie the inlet ports of a mixing valve, and it is axially and circumferentially movable with respect to the cushions. The cam may be moved downward into a full shutoff position in which a cylindrical portion tightly closes both sealing cushions against the inlet ports, or it may be gradually elevated to raise a tapered region into alignment with the sealing cushions to allow the cushions to deflect from the inlet ports to admit an increasing flow of fluid into the valve. The contours of the tapered region are specially shaped to maintain tight shutoff of one inlet port when it is desired to admit fluid from one port only, and also to admit greater amounts of fluid from both ports when full flow of a mixed fluid is desired. Also, the contouring is such that the sensitivity in controlling mixing of the fluids is improved, so that manual dexterity of the operator need not be as precise as for previous valves.

It is an object of the invention to provide increased flow for maximum flow conditions, i.e., those conditions when the control rod cam is brought to its uppermost position.

It is a further object to provide a control rod cam for a fluid proportioning valve in which improved sensitivity of adjustment is obtained when both inlet ports are metered at a substantially high flow.

It is a still further object to provide a high flow control rod cam which can easily be incorporated within existing proportioning valves.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in other embodiments, and reference is made to the claims for interpreting the breadth of the invention.

BRIEF DESCRIPTION OF THE DRAWINGS

FIG. 2 is a fragmentary view in cross section of the valve of FIG. 1 taken through the plane 2—2 showing a flow control cam of the valve in a raised position, FIG. 3 is a fragmentary view in cross section also taken through the plane 2—2 but showing the flow control cam rotated 90° to seal off one inlet port of the valve, FIG. 4 is a view in cross section taken through the plane 4—4 of FIG. 2, FIG. 5 is a view in cross section taken through the plane 5—5 of FIG. 3.

DESCRIPTION OF THE PREFERRED EMBODIMENT

Figure 1:
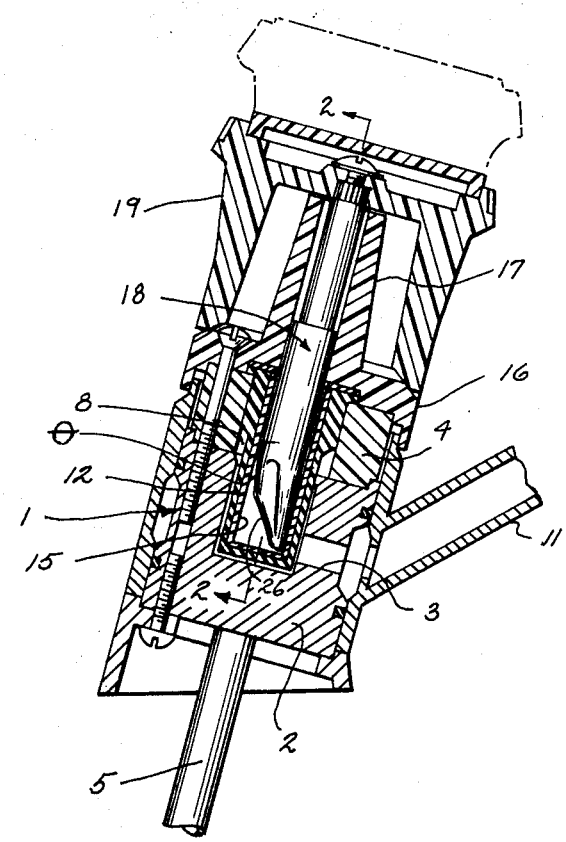
FIG. 1 is a side view in cross section of a fluid proportioning valve embodying the invention.
Figure 6:
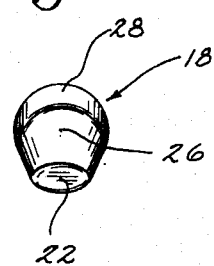
FIG. 6 is an end view of the flow control cam.

Referring to FIG. 1, a fluid proportioning valve includes a body 1 comprised of two principal components, namely a lower section 2 which has an outlet opening 3, and an upper section 4 seated directly upon the lower section 2. Fluid inlet pipes 5 feed inlet ducts 6 and 7, FIGS. 2–5, which run through the lower section 2 upward into the upper section 4, and then turn radially inward to open into an internal, generally cylindrical recess 8. The ducts 6 and 7 form a pair of diametrically opposed inlet ports 9 and 10 at the points where they open upon the recess 8. The recess 8 extends completely through the upper section 4, and proceeds downward into the lower section 2 as a cavity, the bottom of which is closed and in communication with the outlet opening 3 and a rotatable swing spout 11. The cavity constitutes a mixing chamber for dissimilar fluids, such as hot and cold water, entering through the inlet ports 9 and 10, and it is the intent of the present invention to provide an improved control device for regulating the flow through these ports 9 and 10.

A flexible sleeve 12 having a closed bottom is inserted within the recess 8 and is flanged at its top so that it will rest upon the head of the upper section 4. The sleeve 12 is characterized by having a pair of inlet sealing cushions 13 and 14 which are located interior to the inlet ports 9 and 10, as seen in FIGS. 2–5. A secondary stiffening sleeve 15 of a more rigid plastic material is inserted within the sleeve 12, and has diametrically opposite apertures through which the sealing cushions 13 and 14 protrude. Hence, the secondary sleeve 15 acts as a stiffener for the flexible sleeve 12 except at the loci of the sealing cushions 13 and 14. As a result of this construction, the sealing cushions 13 and 14 are free to be moved toward and away from the inlet ports 9 and 10 so as to function as valves, with the remainder of the sleeve 12 being reinforced and substantially nondeformable to reduce the tendency of water pressure to collapse the sleeve 12.

Capping the upper end of the valve body 1 is a bearing member 16 (see FIG. 1) for holding the sleeves 12 and 15 in place, and it has an elongate, tubular portion 17 extending upward from the recess 8. Inserted within the bearing member 16 and the sleeves 12, 15 is a long, thin control rod cam 18, the upper end of which is fluted and keyed to fit securely within a corresponding recess in a handle 19. The handle 19 and cam 18 may be pulled upwardly, as shown in phantom lines, or returned downwardly, and also rotated for the purpose of controlling fluid flow.

The fluid proportioning valve as described up to this point follows closely upon a general construction like that of the valve shown in the aforesaid U.S. Pat. Nos. 3,646,966 and 3,519,018. The present invention resides in the lower structure of the control rod cam 18, which will now be described.

The control rod cam 18 has a substantially cylindrical valve closing portion 20 that is medially disposed slightly below the longitudinal center. This cylindrical portion 20 is in axial alignment and concentric with the inlet ports 9, 10 when the cam 18 is in the lower position of FIG. 1. In this position, the cylindrical portion 20 tightly sandwiches both sealing cushions 13 and 14 against the ports 9 and 10 to cut off fluid flow through the valve.

The control rod cam 18 also has a tapered region 21 that converges downward from the cylindrical portion 20 toward a lower, distal end 22, and as shown in FIGS. 2–5 the tapered region 21 may be brought into facing relation with the inlet ports 9 and 10 by raising the cam 18. As particularly shown in FIG. 3, the tapered region 21 is canted with respect to the axis of the cylindrical portion 20, and the angle $\phi$ has been drawn in FIG. 3 to illustrate this cant. The tapered region has complex surface configurations which give it a unique appearance, and its profile as seen in FIG. 3 may aptly be described as resembling a bent figure.

Still referring to FIG. 3, there is an initial slope $\theta$ at the vicinity 28 of the dorsal, or knuckle side of the tapered region 21. Such angle $\theta$ diverges inwardly from a continuation of the cylindrical surface of the valve closing portion 20. The angle $\theta$ is the maximum slope of the upper part of the tapered region 21, i.e. at the level where the tapered region 21 departs from the cylindrical portion 20. This upper part of the tapered region 21 controls the smaller rates of fluid flow, and when the control rod cam 18 is placed at an altitude in which the vicinity 28 is aligned with the ports 9, 10 a maximum opening for a low flow rate from either port is obtained by rotating the vicinity 28 into a frontal position with respect to the selected port 9, 10.

As further seen in FIG. 3, a straight port closing face 25 runs along the entire ventral side of the tapered region 21 opposite the dorsal side. This closing face 25 merges at its upper end with the port closing surface of the cylindrical portion 20, and then descends at an angle to protrude at the distal end 22 radially outward of a continuation of the surface of the cylindrical portion 20. The closing face 25 can be a cylindrical segment that is at an angle to the portion 20, such angle being a characteristic of the cant of the tapered region 21.

At the level, or altitude of the vicinity 28 the surface of the tapered region 21 can be nearly conical in form, such cone shape being at a cant. Then, the angle $\theta$ at the vicinity 28 provides the maximum low level flow, and as the control rod cam 18 is rotated the amounts of flow from the two ports 9, 10 is proportioned to obtain the desired mixing of fluids.

Figure 7:
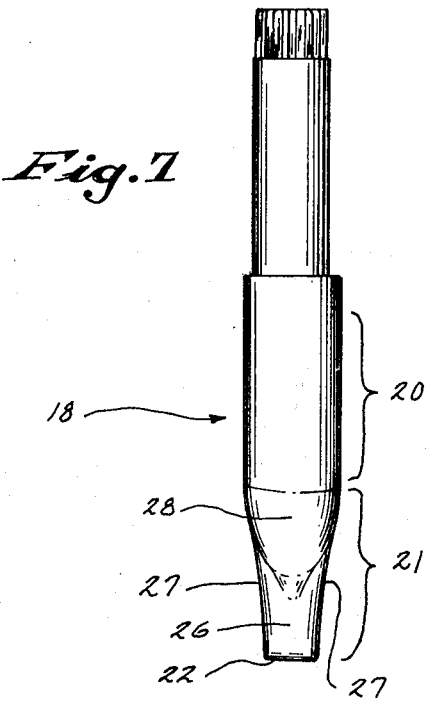
FIG. 7 is an elevational view of the flow control cam shown in FIG. 2 but rotated 180°.

The tapered region 21 includes a receding face 26 on its dorsal side which descends from the vicinity 28 to the distal end 22 at an angle falling inside a continuation of the initial slope angle $\theta$. This creates the characteristic knuckle appearance of the dorsal side, as seen in profile in FIG. 3. Inwardly dished contours 27 are provided on the intermediate sides of the tapered region 21 between the dorsal and ventral sides. The taper of these contours 27 is best shown in FIGS. 2 and 7, and the contours 27 restrict the circumferential extent of the port closing face 25 to a distance substantially coextensive with the circumferential extent of an inlet port 9, 10. This restriction is best depicted in FIGS. 4 and 5. Preferably, the contours 27 also commence, at their upper ends, slightly below the juncture of the tapered region 21 with the cylindrical portion 20.

A salient feature of the complex configuration of the tapered region 21 is to provide enhanced volumetric flow characteristics as the cam 18 is raised to have the portion 21 ascend into interplay with the inlet ports 9 and 10. Also, the tapered region 21 provides improved control over the mixing of fluids admitted through the ports 9 and 10 upon the rotation of the handle 19. As seen in FIGS. 2 and 4, when the port closing face 25 is co-extensive with a side of the secondary sleeve 15 between the ports 9, 10, raising or lowering of the cam 18 will result in the admission of equal amounts of fluid through each of the ports 9, 10. On the other hand, if the cam 18 is turned to bring the closing face 25 toward full engagement with one of the ports, say port 9, as illustrated in FIGS. 3 and 5, there will be a lesser amount of fluid admitted through the port 9 than through the open port 10. Mixture control is thus attained by rotational adjustment. At the point where the closing face 25 provides a full shutoff of one port, say port 9, it can be seen that this shutoff is due to the face 25 being co-extensive with the port diameter.

One of the factors which contributes to improved flow behavior is the limitation of the initial, gradual slope $\theta$ to a short length, for the fine control of lesser amounts of flow, in combination with the receding face 26 which allows much greater flow than prior constructions. The receding top face 26 can slope as sharply toward the port closing face 25 as the strength of the rod material will allow, while still prohibiting axial bending of the rod. The inwardly dished contours 27 also allow the sealing cushions 13 and 14 to deflect farther from the ports 9, 10 to achieve or maintain a full flow when mixing incoming fluids.

Figure 8:
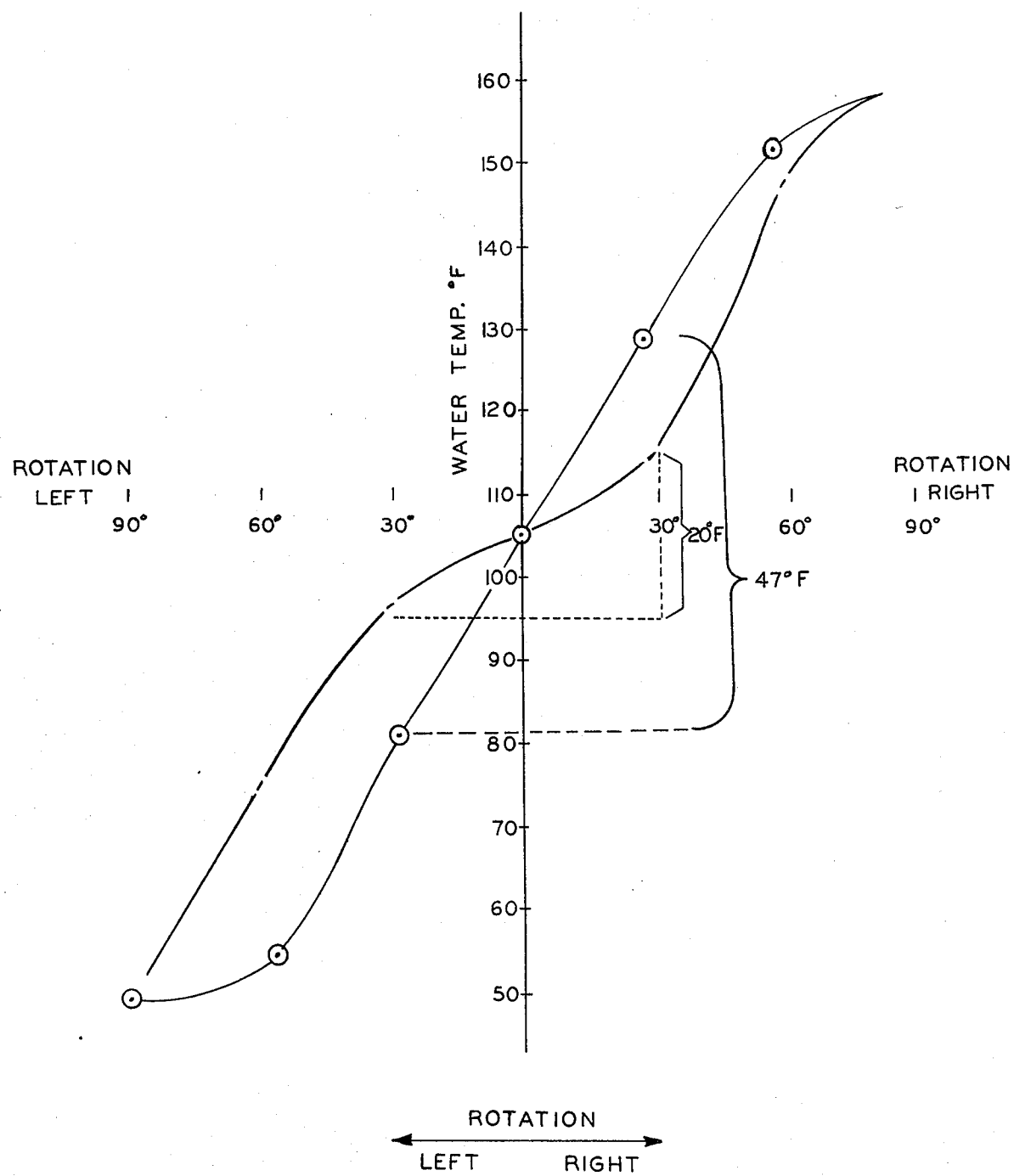
FIG. 8 is a graph for the valve portraying fluid mixture temperature in response to rotational displacement of the flow control cam.

As shown in the graph of FIG. 8, the control rod cam 18 of the present invention provides increased sensitivity of adjustment for the mid range of rotation, when ports 9 and 10 both admit a substantial portion of the total flow. The vertical axis of this graph represents outlet temperature in °F, while the horizontal axis indicates the rotational travel of the control rod cam 18 in degrees of rotation. The solid line trace is the result obtained from the use of the present control rod cam 18, and the broken line curve depicts measurements for a prior art control rod. An analysis of the graph shows that the present control rod cam 18 provides a more sensitive proportioning of fluids for a range of rotation from 30° to the left to 30° to the right. For example, the present cam 18 furnishes a 1°F increment in mixture temperature for every 3° of rotation. In contrast, the prior art rod provides 2.35°F change for every 3° of rotation. As a result, it is easier to control outlet temperature with the present invention, since a greater rotation is required for a given temperature change. The particular results of FIG. 8 were obtained for inlet temperatures of 50°F and 160°F for the cold and hot inlet ports respectively.

The present invention enhances a sleeve type mixing valve by providing better volumetric flow and easier adjustment of temperature through the introduction of new surface contours for the control rod cam. A tapered end is canted, and this end is modified in configuration to have a sharply receding dorsal surface and dished side face contours. The cant causes the ventral, shut-off surface to taper radially outward for better shut-off, and the other special contours provide improved control of fluid flow through the associated sleeve valve. The particular control rod cam of the drawings has some surface discontinuities between the various areas of the tapered region. This is not necessary, and the results of the invention are also achievable with smoothly blended curved surfaces that meld one into the other.

I claim:

1. A control rod cam for a sleeve type mixing valve that is moved axially to control the volume of flow through valve inlet ports, and that is rotated to control the mixing of the flow through the ports, such cam having:
    a. a valve closing portion providing port closing surface areas; and
    b. a tapered region extending from said valve closing portion that narrows toward a distal end, which tapered region is canted from the axis of said valve closing portion and presents:
        i. an initial slope along a dorsal side of the tapered region for allowing opening of a valve port, and
        ii. a port closing face along the ventral side of the tapered region that slopes radially outward beyond the surface of said valve closing portion; and
        iii. a receding face on said dorsal side which descends from said initial slope to said distal end at an angle greater than said initial slope.

2. A control rod cam as in claim 1 having inwardly dished contours on opposite sides between said dorsal side and said port closing face.

3. A control rod cam for a sleeve type mixing valve that is moved axially to control the volume of flow through valve inlet ports, and that is rotated to control the mixing of the flow through the ports, such cam having:
    a. a substantially cylindrical portion providing port closing surface areas; and
    b. a tapered region of multiple contours extending from said substantially cylindrical portion toward a distal end, such region presenting:
        i. an initial slope along a dorsal side for allowing opening of a valve port,
        ii. a port closing face along the ventral side that protrudes at the distal end radially beyond the surfaces of said substantially cylindrical portion;
        iii. inwardly dished contours on opposite sides lying between said dorsal and ventral sides that limit the circumferential extent of said port closing face to an amount substantially co-extensive with an inlet port; and
        iv. a receding face on said dorsal side which descends from said initial slope to the distal end at an angle greater than said initial slope to form a knuckle with said initial slope.

4. A control rod cam for a sleeve type mixing valve that is moved axially to control the volume of flow through valve inlet ports, and that is rotated to control the mixing of the flow through the ports, such cam having:
    a. a substantially cylindrical portion providing port closing surface areas; and
    b. a tapered region extending from said substantially cylindrical portion toward a distal end, such tapered region having:
        i. an initial slope along a dorsal side that merges with said substantially cylindrical portion and slopes inward therefrom for allowing opening of a valve port, such initial slope being the maximum slope of said tapered region where it joins with said substantially cylindrical portion;
        ii. a port closing face along the side opposite said dorsal side that is a cylindrical surface of port width canted at an angle from said substantially cylindrical portion;
        iii. a receding face on said dorsal side which descends from said initial slope to said distal end at an angle greater than said initial slope; and
        iv. inwardly dished contours on the sides of said tapered region between said dorsal side and said port closing face.

* * * * *